(12) United States Patent
Borrell

(10) Patent No.: US 12,458,974 B2
(45) Date of Patent: Nov. 4, 2025

(54) DEHULLING SYSTEM FOR SOFT-SHELLED NUTS

(71) Applicant: Jose Borrell S.A., Denia (ES)

(72) Inventor: Jose Vicente Roig Borrell, Denia (ES)

(73) Assignee: Jose Borrell S.A., Denia (ES)

( * ) Notice: Subject to any disclaimer, the term of this patent is extended or adjusted under 35 U.S.C. 154(b) by 963 days.

(21) Appl. No.: 17/112,296

(22) Filed: Dec. 4, 2020

(65) Prior Publication Data

US 2021/0170417 A1    Jun. 10, 2021

(30) Foreign Application Priority Data

Dec. 5, 2019    (ES) ............................... ES201931080

(51) Int. Cl.
*B02B 3/04*        (2006.01)
*A23N 5/00*        (2006.01)

(52) U.S. Cl.
CPC ............... *B02B 3/045* (2013.01); *A23N 5/00* (2013.01)

(58) Field of Classification Search
CPC . A23N 5/00; A23N 5/08; A23N 5/002; A23N 5/004; A23N 5/006; A23N 5/00808; B02B 3/045; B02B 3/00; B02B 3/04
See application file for complete search history.

(56) References Cited

U.S. PATENT DOCUMENTS

| | | | | |
|---|---|---|---|---|
| 3,165,134 A | * | 1/1965 | Wayne | B02B 3/00 99/605 |
| 3,857,333 A | * | 12/1974 | Satake | B02B 3/045 198/530 |
| 4,317,411 A | * | 3/1982 | Forrest | A23N 5/01 99/623 |
| 5,431,094 A | * | 7/1995 | Savage, Sr. | A23N 5/08 99/626 |
| 11,259,556 B2 | * | 3/2022 | Borrell | B07B 1/20 |
| 2009/0301320 A1 | * | 12/2009 | Borrell | A23N 5/008 99/569 |

FOREIGN PATENT DOCUMENTS

| | | | | |
|---|---|---|---|---|
| CN | 108405031 A | * | 8/2018 | |
| DE | 4034739 A1 | * | 5/1992 | ............... B02B 1/00 |
| DE | 10333020 A1 | * | 2/2005 | ............ A23N 12/026 |

OTHER PUBLICATIONS

Translation of DE-4034739-A1 (Year: 1992).*
Translation of DE-10333020-A1 (Year: 2005).*

* cited by examiner

*Primary Examiner* — Hung D Nguyen
(74) *Attorney, Agent, or Firm* — Farber LLC

(57) ABSTRACT

A dehulling system for soft-shelled nuts includes at least two dehulling stations arranged in series, where each station is made up of at least one dehulling machine in a first dehulling stage and a screening machine in a second screening stage, both being a first and a second consecutive stages. The screening machine is a densimetric separator located lower than the dehulling machine and has an upper product inlet towards the interior thereof, which comprises a drum arranged according to an inclined plane, a first outlet for the dehulled grain in the upper part of the drum and a second outlet for the rest of materials other than the dehulled grain in the lower part of the drum.

9 Claims, 4 Drawing Sheets

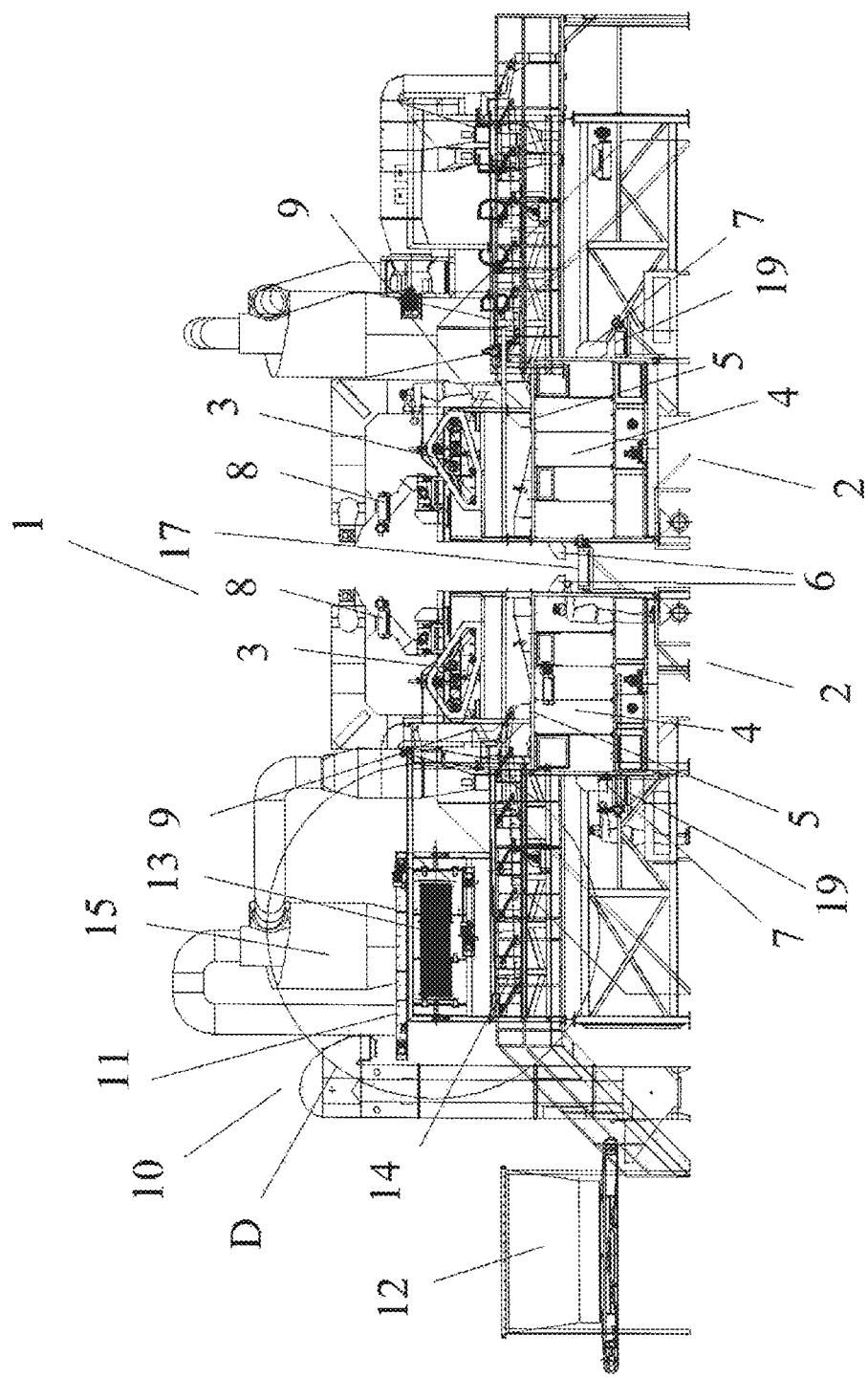
Fig. 2.1

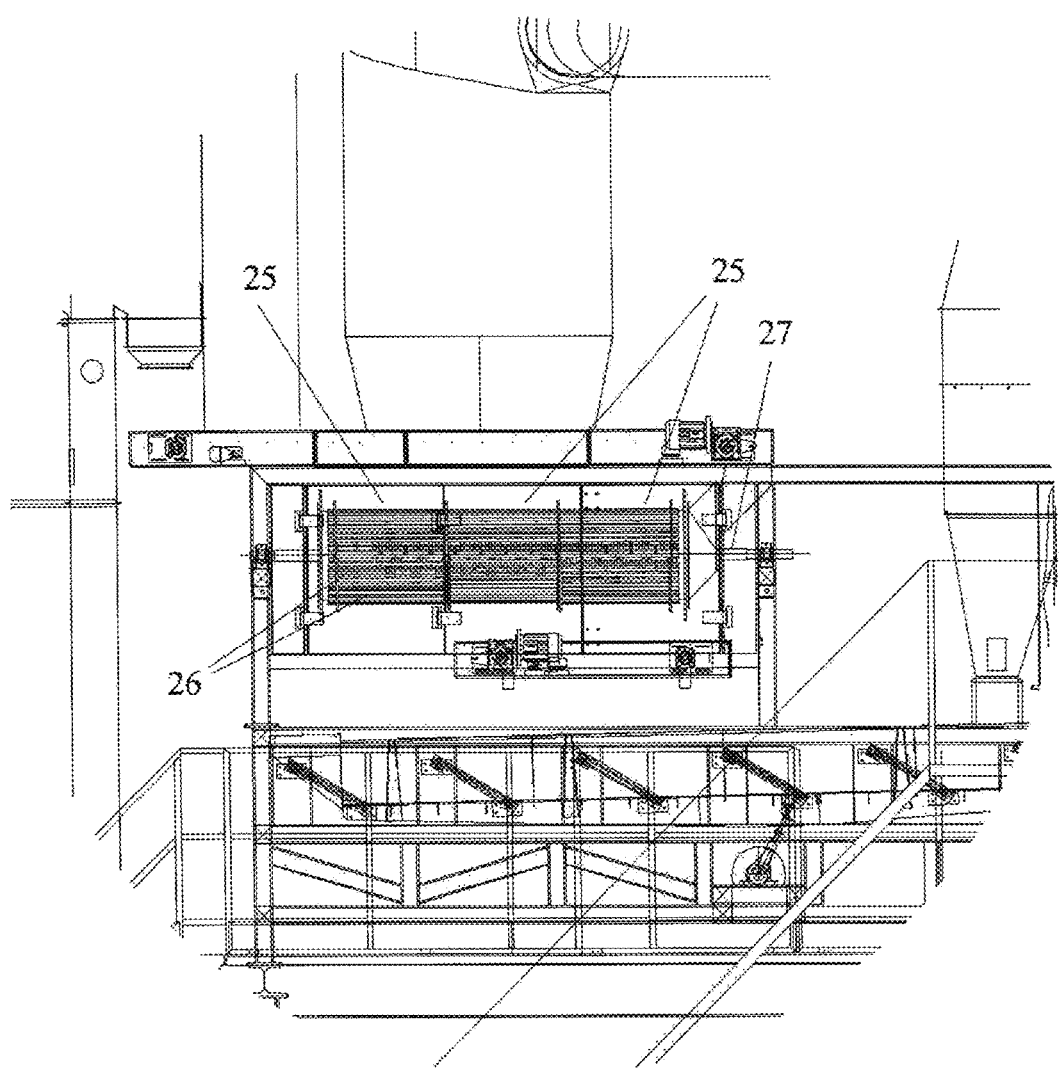
Fig. 2.2

DEHULLING SYSTEM FOR SOFT-SHELLED NUTS

FIELD OF THE INVENTION

The present invention pertains to the technical field of nuts dehulling processes, specifically a dehulling system formed by at least two dehulling stations arranged in series, where each station has at least one dehulling machine and a screening machine such that the dehulling process at each station consists of at least a first dehulling stage and a second screening stage consecutively.

BACKGROUND OF THE INVENTION

At present there are several machines and systems for dehulling operations which vary in the way they act on the product, depending on the characteristics thereof.

Specifically, for the dehulling soft-shelled nuts, it is common the use of a dehulling system consisting of several dehulling stations arranged in series.

Each of these stations is made up of a first stage in which a dehulling machine takes care of the shelling of the nuts. The product obtained from this first dehulling stage is both the dehulled fruit and the resulting skins together with a percentage of nuts that are not dehulled.

Subsequently, this product resulting from the first dehulling stage passes to a second stage in which a screening machine arranged afterwards performs the filtering thereof. This machine includes a suction mechanism so that in said screening stage, on the one hand, the dehulled grain is filtered in order to separate it from the rest of the elements and, on the other hand, the skins and/or shells are sucked such that only the not dehulled nuts remain which are moved to the next dehulling station where the process is repeated.

These systems, developed in this way to solve the problem generated by the accumulation of shells and not dehulled nuts mixed with the dehulled nuts, entail multiple drawbacks due to the large size of all the machinery needed.

Thus, said dehulling systems can include a large number of dehulling stations arranged in series, usually between 8 and 10 stations, and each of these stations has its own dehulling machine and consecutively its own screening machine, as well as a suction machine for skins and/or shells. This generates the need to occupy large spaces and very high costs due to the amount of machinery involved.

Furthermore, the above manner of proceeding means that the machines in the first stage are operating at full capacity, while progressing through the successive stations, the machines receive less and less product to process and those located in the last stations are almost empty. Therefore, the last are poorly exploited and at the same time they represent a significant expense in transporting the product from one machine to another and in energy.

In these systems, it is difficult to make adjustments because since by being the screens located at a certain distance from the dehulling machine, it is not easy at all to make the necessary adjustments between the two, so the machines lose efficiency.

On the other hand, the suction mechanisms necessary to extract the shells from the whole are cumbersome and expensive.

In the state of the art, no way to simplify these nuts dehulling systems has been found, in such a way that may be possible to reduce energy costs, the mechanisms involved and the space occupied by the number of machines, and all this by means of some machines working at full capacity and therefore being much more efficient than those integrated in the current systems.

SUMMARY OF THE INVENTION

The dehulling system for soft-shelled nuts disclosed herein comprises at least two dehulling stations arranged in series, where each station is made up of at least one dehulling machine in a first dehulling stage and a screening machine in a second screening stage, both being a first and a second consecutive stages.

Furthermore, in each of the stations of this dehulling system, the screening machine is a densimetric separator located lower than the dehulling machine and comprises an upper product inlet towards the interior thereof, which comprises a drum arranged according to an inclined plane, a first outlet for the dehulled grain in the upper part of the drum and a second outlet for the rest of materials other than said dehulled grain in the lower part of said drum.

Said screening machine comprises in its interior air drive means and drum vibration means for moving the dehulled grain towards the first outlet in the upper part and moving the rest of materials towards the second outlet in the lower part of the same.

Meanwhile, the dehulling machine has an inlet for feeding it and an outlet for the product obtained from the first dehulling stage, directly connected to the upper inlet of the screening machine.

The materials collected from the second outlet of the screening machine are transferred to a new consecutive dehulling station.

With the dehulling system for soft-shelled nuts here proposed, a significant improvement in the state of the art is obtained.

This is so because a dehulling system is achieved in which the dehulling machine and the screening machine in each station of the system are arranged one above the other and connected to each other, in such a way that a significant reduction in the occupation space is achieved.

As they are connected one above the other, a joint regulation of both machines is possible in each of the stages, so that a greater effectiveness of both machines is obtained.

In addition, by using a densimetric separator as a screening machine, a natural separation is achieved between the dehulled grain and the rest of elements such as skins, shells, leaves, which move towards the bottom. As there are no screens, the system is much easier to be adjusted at the desired levels.

Likewise, said densimetric separators work better as the greater amount of product they have inside, since no suction machines are used for the skins due that it is important that skins will remain inside the separator and be separated by gravimetry towards the bottom. The only suctions that are usually applied in the present system are internal suctions of the separating machine, or even small suctions arranged before and/or after the dehulling machine, to suck up the dust. These aspirations are of a small entity, they do not present any complexity and their occupation and cost are very low.

The above significantly reduces the complication of the system, as well as the economic investment on the system and the occupation in terms of space.

Furthermore, by using fewer machines, it is much easier to regulate the parameters of the system.

It is therefore a very efficient system, which manages to reduce occupation and costs and at the same time allows a better operation of the machines involved, also reducing the number of them.

BRIEF DESCRIPTION OF THE DRAWINGS

In order to help for a better understanding of characteristics of the invention, according to a preferred example of a practical embodiment thereof, a set of drawings is provided as an integral part of said description, where with an illustrative and non-limiting character, representations show the following:

FIG. 2.1 shows a cross-section view through A-A' of a dehulling system for soft-shelled nuts according to a preferred embodiment of the invention.

FIG. 2.2 shows a view of a detail D in FIG. 2.1, which shows the integrated machine of the additional station in a dehulling system for soft-shelled nuts according to a preferred embodiment of the invention.

DETAILED DESCRIPTION OF THE INVENTION

Figure 1:
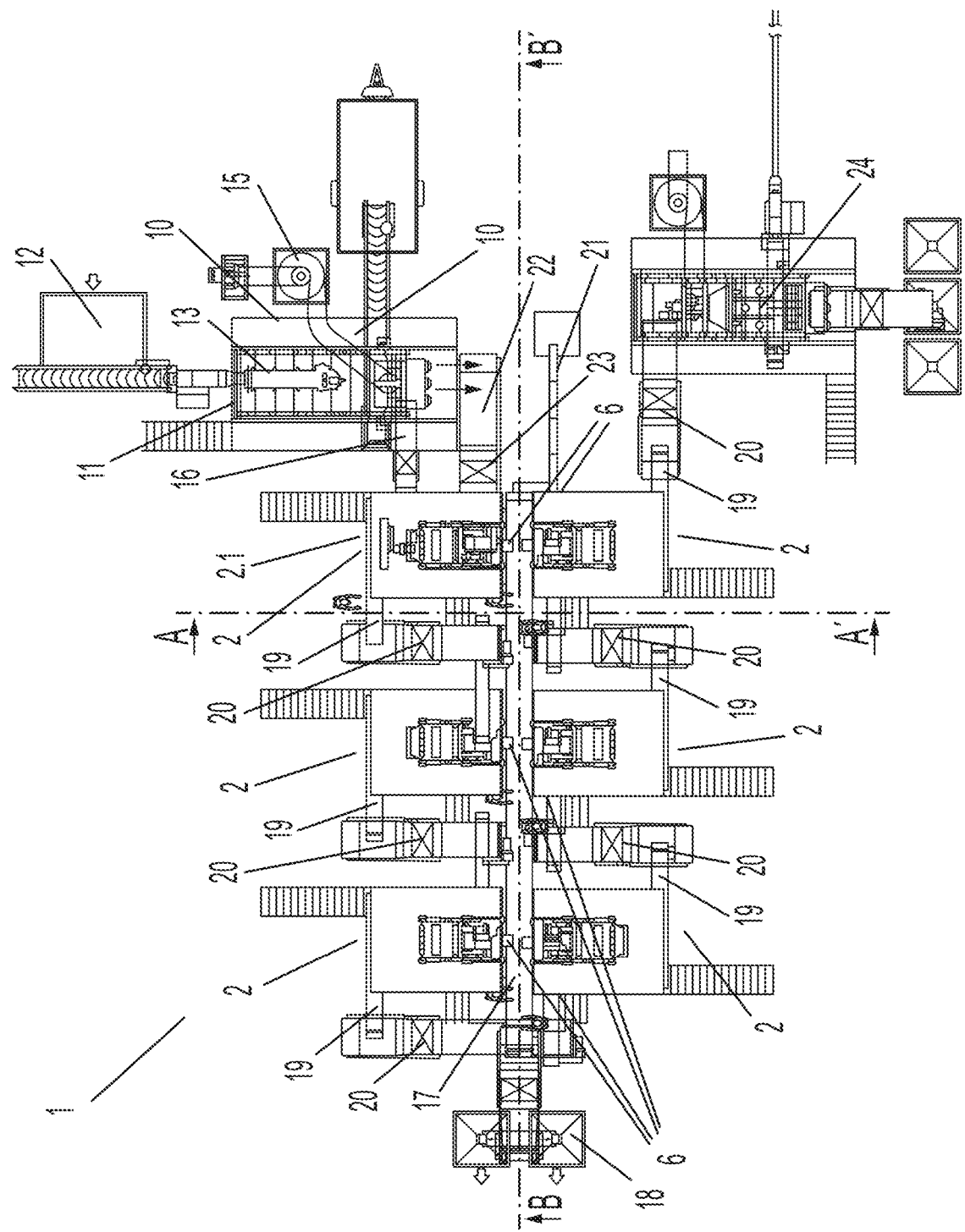
FIG. 1 shows a plan view of a dehulling system for soft-shelled nuts according to a preferred embodiment of the invention.

In view of the accompanying figures, it can be seen how in a preferred embodiment of the invention, the dehulling system (1) for soft-shelled nuts proposed herein comprises at least two dehulling stations (2) arranged in series, where each station (2) is made up of at least one dehulling machine (3) for a first dehulling stage and a screening machine (4) for a second stage of screening, both the first and second stages being consecutive.

In this preferred embodiment of the invention as shown in FIG. 1, the system comprises 6 stations (2), each of which includes a dehulling machine (3) and a screening machine (4).

Furthermore, in this dehulling system (1), the screening machine (4) is a densimetrc separator that is located lower than the dehulling machine (3) and comprises an upper product inlet (5) towards the interior of thereof where it has a drum arranged according to an inclined plane, a first outlet (6) for the dehulled grain located at the upper part of the drum and a second outlet (7) for the rest of materials other than said dehulled grain located at the lower part of the drum.

Meanwhile, the dehulling machine (3) has a feeding inlet (8) and an outlet (9) for the product obtained from the first dehulling stage directly connected to the upper inlet (5) of the screening machine (4).

Materials collected in the second outlet (7) of the screening machine (4) are transferred to a new consecutive dehulling station.

In this preferred embodiment of the invention, the dehulling machine (3) comprises a mechanism formed by a closed band located lower than the upper product inlet (5) and arranged around two rollers separated from each other which determine a first and second ends of the band, where one of said rollers is machined with means of rotation around its central axis such that the upper part of the band has a movement from the first end towards the second end and, a third roller connected to a motor with a rotating movement in the opposite direction to that of the machined roller of the band and located above it, at a distance such that a space for the fruit to pass through is defined between them.

Figure 3:
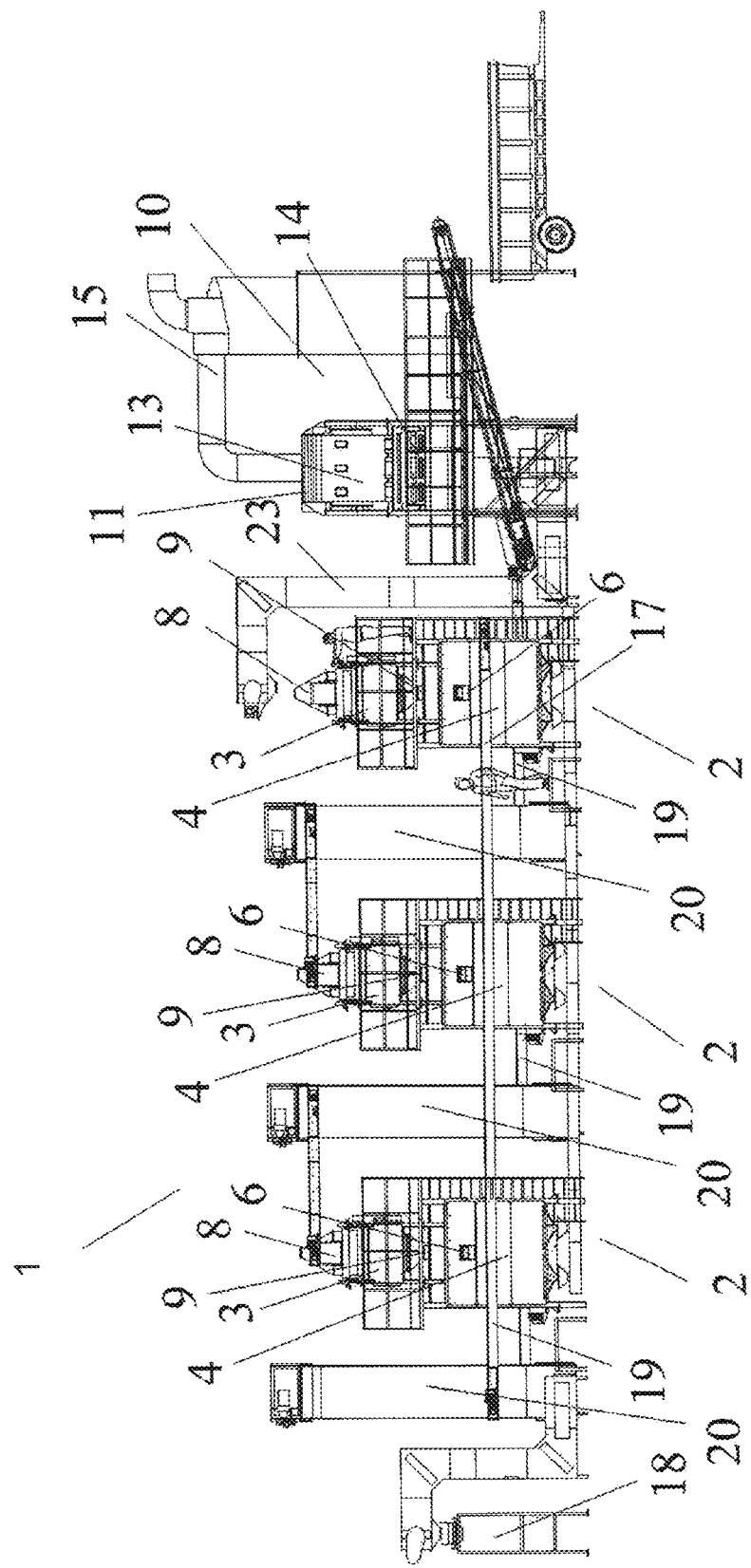
FIG. 3 shows a view through a section B-B' in a dehulling system for soft-shelled nuts according to a preferred embodiment of the invention.

According to another aspect, as shown in FIGS. 1 to 3, in this preferred embodiment of the invention, the dehulling system (1) comprises an additional station (10), prior to the first dehulling station (2.1), formed at least by a mechanism for peeling the fruit.

In this case, said additional station (10) is comprised of an integrated machine (11) comprising a hopper (12) for feeding the peeling mechanism (13), screening means (14) arranged lower than the mechanism peeling (13) comprising an inlet connected to the outlet of the screening means (14) and having at least one screening element to separate the product into two levels, and selection means (15) by suction applied to at least one level of the screening means (14).

In this way, the fruit that enters the system (1) first passes through said additional station (10) in which a previous peeling of the nuts is carried out. Thus, it enters through the feeding hopper (12) to the peeling mechanism (13), in this case formed by cylindrical receptacles (25) the lateral surface of which is formed by a plurality of bars (26), and a rotating central shaft (27) provided with finger-like elements radially projected outward from various longitudinal positions of said central shaft. The outlet for the mixture is located at the end of the receptacle (25) arranged furthest from the feeding hopper (12).

From said outlet, the nuts go directly to screening means (14) with various levels and selection means (15) by suction in at least some of them, so that the skins on the one hand are sucked to extract them from the process and likewise, the grains that may exist due to some nuts dehulled during peeling are also sucked. In this case in which a quantity of dehulled fruit is produced in the additional station (10), it comprises a first conveyor belt (16) and an elevator for said dehulled fruit to the inlet (5) of the screening machine (4) in the first station (2.1), so that these grains are redirected to the screening machine (4) in the first station (2.1) without going through the dehulling machine (3) in the same. The rest of the peeled fruit is transported by means of a conveyor belt (22) and an elevator (23) to the inlet (8) of the dehulling machine in the first station (2.1).

According to the above, the fruit that passes to the first dehulling station (2.1) is a shelled and clean fruit. In this first station (2.1), the clean fruit first enters to the dehulling machine (3) and when leaves it, directly enters to the screening machine (4).

From this screening machine (4), the dehulled grain leaves through a first outlet (6) which, as shown in FIGS. 2 and 3, is located in the upper part of the drum, and the dehulled grain reaches a second conveyor belt (17) that transports it to a collection area (18).

Meanwhile, as can be seen in FIGS. 1 to 3, the rest of the materials leave through a second outlet (7) on the lower part of the drum and the system (1) comprises means for transporting said materials to the dehulling machine (3) of the consecutive station (2), formed by a third conveyor belt (19). This third conveyor belt (18) transfers the product to an elevator (20) that carries the product to the entrance level of the dehulling machine (3) of the next station and the process is repeated again. In the last station, the elevator transports the material to a final screening machine (24).

In each consecutive station (2) the partition size in the dehulling machine (3) is gradually adjusted and is smaller than that of the station (2) prior to it. On the other hand, in this preferred embodiment of the invention, all the dehulled nuts are collected on the same second conveyor belt (17), which carries all of the dehulled fruit collected from all the stations (2) to a same collection area (18).

In this preferred embodiment of the invention, the screening machine (4) comprises an internal sucking mechanism to remove the dust generated inside and the collected dust from the screening machines (4) in all stations (2) is collected by means of an endless screw (21).

Likewise, it comprises a suction mechanism before and after the dehulling machine (3) in each station. In other embodiments, the suction mechanism can only be located before said machine for suctioning the dust and those foreign elements that may accompany the fruit, or after it for sucking the skins generated by said machine.

The described embodiment constitutes only an example of the present invention, therefore, the specific details, terms and phrases used in the present specification are not to be considered as limiting, but are to be understood only as a basis for the claims and as a representative basis to provide an understandable description as well as sufficient information to the person skilled in the art to apply the present invention.

What is claimed is:

1. A dehulling system for soft-shelled nuts, comprising:
   at least two dehulling stations arranged in series, where each of the at least two dehulling stations is formed by at least one dehulling roller machine for a first dehulling stage and a dry screening machine for a second dry screening stage, wherein the first stage and the second stage are consecutive, and wherein in each of the at least two dehulling stations:
   the dry screening machine is a densimetric separator that is located lower than the at least one roller dehulling machine and which comprises an upper product inlet towards an interior of the dry screening machine, wherein the dry screening machine has a drum arranged according to an inclined plane, a first outlet for dehulled nuts in an upper part of the drum and a second outlet for the rest of material other than the dehulled nuts in a lower part of the drum; and
   the at least one roller dehulling machine has a feeding inlet and an outlet for the dehulled nuts obtained from the first dehulling stage, wherein the outlet is directly connected to the upper product inlet of the dry screening machine,
   wherein the material collected from the second outlet of the dry screening machine are transferred to a new consecutive dehulling station.

2. The dehulling system for soft-shelled nuts according to claim 1, wherein the at least one roller dehulling machine further comprises a mechanism formed by a closed band located lower than the inlet and arranged around two rollers separate from each other which determine a first end and a second end of the closed band, wherein one of said two rollers comprises a rotation mechanism around its central shaft such that an upper part of the band presents a movement from the first end towards the second end and wherein a third roller is connected to a motor with a rotating movement in an opposite direction to that of the machined roller of the band and is located higher than it, at a distance such that a space to pass through the nuts is provided between them.

3. The dehulling system for soft-shelled nuts according to claim 1 further comprising an additional station positioned before the at least two dehulling stations, comprised of at least one rotational-shaft peeling mechanism for peeling the nuts.

4. The dehulling system according to claim 3, wherein said additional station is formed by an integrated machine that comprises a feeding hopper for the at least one rotational-shaft peeling mechanism, a screening means arranged lower than the at least one peeling mechanism, wherein the screening means comprise an inlet connected to an outlet and at least one densimetric dry screening machine to separate product into two levels, and suction selection means to be applied to at least one of the two levels of the densimetric dry screening machine.

5. The dehulling system for soft-shelled nuts according to claim 3, wherein said additional station produces a quantity of dehulled nuts and comprises a conveyor belt for transporting the dehulled nuts to the upper product inlet of the dry screening machine in the first dehulling station.

6. The dehulling system for soft-shelled nuts according to claim 1, wherein the dry screening machine in each of the at least two dehulling stations comprises an internal suction mechanism to eliminate dust generated in an interior of the dry screening machine.

7. The dehulling system for soft-shelled nuts according to claim 1 further comprising a suction mechanism positioned before and/or after the at least one dehulling roller machine in each of the at least two dehulling stations.

8. The dehulling system for soft-shelled nuts according to claim 1 further comprising a conveyor belt for transporting the dehulled nuts produced in the at least two dehulling stations to a collection area.

9. The dehulling system for soft-shelled nuts according to claim 1 further comprising a transporter which moves the material collected from the second outlet of the dry screening machine to the at least one dehulling roller machine in the consecutive dehulling station, said transporter comprising at least one conveyor belt.

* * * * *